United States Patent
Hou et al.

(10) Patent No.: US 7,180,638 B1
(45) Date of Patent: Feb. 20, 2007

(54) NETWORK FAX MACHINE USING A WEB PAGE AS A USER INTERFACE

(75) Inventors: Xiaoan Hou, Santa Clara, CA (US); Yahya Hamadani, Sunnyvale, CA (US)

(73) Assignee: Ricoh Co., Ltd., Tokyo (JP)

( * ) Notice: Subject to any disclaimer, the term of this patent is extended or adjusted under 35 U.S.C. 154(b) by 0 days.

(21) Appl. No.: 09/504,965

(22) Filed: Feb. 16, 2000

(51) Int. Cl.
*H04N 1/00* (2006.01)
*H04N 1/32* (2006.01)
*G06K 9/60* (2006.01)

(52) U.S. Cl. .................. 358/439; 358/402; 358/403; 358/407; 358/434; 358/440; 358/442; 358/450; 358/468; 382/305; 382/306

(58) Field of Classification Search ............... 358/400, 358/402, 403, 407, 434, 439, 440, 442, 468, 358/450, 1.15; 379/88.13, 100.01, 93.14, 379/93.15; 709/206; 382/305, 306
See application file for complete search history.

(56) References Cited

U.S. PATENT DOCUMENTS

| | | |
|---|---|---|
| 3,597,071 A | 8/1971 | Jones |
| 3,638,937 A | 2/1972 | Schulz et al. |
| 3,652,700 A | 3/1972 | Suzuki et al. |
| 3,680,127 A | 7/1972 | Richard |
| 3,804,005 A | 4/1974 | Burger et al. |
| 3,816,652 A | 6/1974 | Barnett |
| 3,818,126 A | 6/1974 | Fomenko et al. |
| 3,830,962 A | 8/1974 | Mailloux |
| 3,869,569 A | 3/1975 | Mason et al. |
| 3,884,408 A | 5/1975 | Leiter et al. |
| 3,905,594 A | 9/1975 | Davis |
| 3,907,279 A | 9/1975 | Ervin |
| 3,944,207 A | 3/1976 | Bains |
| 3,995,748 A | 12/1976 | Looney |
| 4,083,550 A | 4/1978 | Pal |
| 4,086,443 A | 4/1978 | Gorham et al. |
| 4,134,581 A | 1/1979 | Johnson et al. |
| 4,134,672 A | 1/1979 | Burlew et al. |

(Continued)

FOREIGN PATENT DOCUMENTS

DE   350 7479   9/1986

(Continued)

OTHER PUBLICATIONS

*Product Overview*, <http://www.efax.com/products/>, printed Nov. 2, 1999.

(Continued)

*Primary Examiner*—Cheukfan Lee
(74) *Attorney, Agent, or Firm*—Oblon, Spivak, McClelland, Maier & Neustadt, P.C.

(57) ABSTRACT

A network fax machine for faxing files received from a remote client includes a server unit and a fax control unit. The server unit sends a fax document form to a remote client and receives fax information from the remote client. The fax information includes an identifier corresponding to a destination fax machine and a file to be faxed to the destination fax machine. The fax control unit is configured to use the identifier to connect the network fax machine to the destination fax machine and configured to send the file to the destination fax machine by facsimile communication.

22 Claims, 9 Drawing Sheets

U.S. PATENT DOCUMENTS

| | | |
|---|---|---|
| 4,145,241 A | 3/1979 | Snellman et al. |
| 4,157,059 A | 6/1979 | Schultes et al. |
| 4,248,528 A | 2/1981 | Sahay |
| 4,291,341 A | 9/1981 | Yajima |
| 4,348,101 A | 9/1982 | Schonfeld et al. |
| 4,352,012 A | 9/1982 | Verderber et al. |
| 4,371,572 A | 2/1983 | Hager |
| 4,374,617 A | 2/1983 | Fisli |
| 4,383,755 A | 5/1983 | Fedder et al. |
| 4,411,418 A | 10/1983 | Poehlein |
| 4,414,579 A | 11/1983 | Dattilo et al. |
| 4,430,563 A | 2/1984 | Harrington |
| 4,437,660 A | 3/1984 | Tompkins et al. |
| 4,470,356 A | 9/1984 | Davis et al. |
| 4,477,175 A | 10/1984 | Snelling |
| 4,477,218 A | 10/1984 | Bean |
| 4,480,825 A | 11/1984 | Landa |
| 4,487,407 A | 12/1984 | Baldwin |
| 4,501,419 A | 2/1985 | Takahashi et al. |
| 4,522,485 A | 6/1985 | Kamiya et al. |
| 4,527,886 A | 7/1985 | Inamori et al. |
| 4,549,222 A | 10/1985 | Fogaroli et al. |
| 4,564,185 A | 1/1986 | Hamlin et al. |
| 4,575,214 A | 3/1986 | Carley |
| 4,587,633 A | 5/1986 | Wang et al. |
| 4,593,323 A | 6/1986 | Kanda et al. |
| 4,602,776 A | 7/1986 | York et al. |
| 4,616,821 A | 10/1986 | Boeve et al. |
| 4,621,801 A | 11/1986 | Sanchez |
| 4,622,592 A | 11/1986 | Ikehata et al. |
| 4,623,244 A | 11/1986 | Andrews et al. |
| 4,652,700 A | 3/1987 | Matthews et al. |
| 4,652,933 A | 3/1987 | Koshiishi |
| 4,654,718 A | 3/1987 | Sueyoshi |
| 4,681,310 A | 7/1987 | Cooper |
| 4,687,191 A | 8/1987 | Stemmle |
| 4,688,924 A | 8/1987 | Anzai et al. |
| 4,696,562 A | 9/1987 | Urata et al. |
| 4,702,630 A | 10/1987 | Igi et al. |
| 4,744,555 A | 5/1988 | Naramore et al. |
| 4,754,300 A | 6/1988 | Fukae |
| 4,757,348 A | 7/1988 | Rourke et al. |
| 4,763,892 A | 8/1988 | Tanaka et al. |
| 4,794,419 A | 12/1988 | Shibazaki et al. |
| 4,796,053 A | 1/1989 | Nakamura et al. |
| 4,809,968 A | 3/1989 | Malachowski |
| 4,814,798 A | 3/1989 | Fukae et al. |
| 4,837,798 A | 6/1989 | Cohen et al. |
| 4,841,375 A | 6/1989 | Nakajima et al. |
| 4,843,434 A | 6/1989 | Lawrence et al. |
| 4,847,643 A | 7/1989 | Ohmori |
| 4,847,891 A | 7/1989 | Kotani |
| 4,849,790 A | 7/1989 | Ito |
| 4,849,815 A | 7/1989 | Streck |
| 4,860,115 A | 8/1989 | Ogura |
| 4,862,288 A | 8/1989 | Sekiya |
| 4,862,289 A | 8/1989 | Shimada |
| 4,872,025 A | 10/1989 | Sekiya et al. |
| 4,893,333 A * | 1/1990 | Baran et al. ............ 379/100.11 |
| 4,899,225 A | 2/1990 | Sasuga et al. |
| 4,899,348 A | 2/1990 | Kiya et al. |
| 4,905,098 A | 2/1990 | Sakata |
| 4,919,318 A | 4/1990 | Wong |
| 4,922,348 A | 5/1990 | Gillon et al. |
| 4,925,171 A | 5/1990 | Kramer et al. |
| 4,925,172 A | 5/1990 | Christy et al. |
| 4,930,017 A | 5/1990 | Izawa |
| 4,935,954 A | 6/1990 | Thompson et al. |
| 4,937,762 A | 6/1990 | Todome |
| 4,939,354 A | 7/1990 | Priddy et al. |
| 4,941,170 A | 7/1990 | Herbst |
| 4,942,406 A | 7/1990 | Tsuda |
| 4,947,266 A | 8/1990 | Watanabe et al. |
| 4,947,345 A | 8/1990 | Paradise et al. |
| 4,953,012 A | 8/1990 | Abe |
| 4,953,036 A | 8/1990 | Yoshimura |
| 4,959,731 A | 9/1990 | Fukae |
| 4,964,154 A | 10/1990 | Shimotono |
| 4,967,287 A | 10/1990 | Nakatani |
| 4,970,504 A | 11/1990 | Chen |
| 4,970,554 A | 11/1990 | Rourke |
| 4,974,097 A | 11/1990 | Kaneko et al. |
| 4,975,841 A | 12/1990 | Kehnemuyi et al. |
| 4,987,447 A | 1/1991 | Ojha |
| 4,991,200 A | 2/1991 | Lin |
| 4,994,926 A | 2/1991 | Gordon et al. |
| 4,996,707 A | 2/1991 | O'Malley et al. |
| 5,008,926 A | 4/1991 | Misholi |
| 5,014,049 A | 5/1991 | Bosley |
| 5,021,776 A | 6/1991 | Anderson et al. |
| 5,021,892 A | 6/1991 | Kita et al. |
| 5,038,218 A | 8/1991 | Matsumoto |
| 5,044,625 A | 9/1991 | Reid |
| 5,048,078 A | 9/1991 | Satomi et al. |
| 5,051,779 A | 9/1991 | Hikawa |
| 5,053,619 A | 10/1991 | Arimoto |
| 5,056,768 A | 10/1991 | Koyama |
| 5,060,980 A | 10/1991 | Johnson et al. |
| 5,065,998 A | 11/1991 | Salomon |
| 5,079,624 A | 1/1992 | Sasuga et al. |
| 5,092,074 A | 3/1992 | Zincke |
| 5,095,372 A | 3/1992 | Silverberg |
| 5,098,074 A | 3/1992 | Mandel et al. |
| 5,101,282 A | 3/1992 | Honma |
| 5,101,283 A | 3/1992 | Seki et al. |
| 5,113,248 A | 5/1992 | Hibi et al. |
| 5,115,326 A | 5/1992 | Burgess et al. |
| 5,121,195 A | 6/1992 | Seki et al. |
| 5,126,858 A * | 6/1992 | Kurogane et al. .......... 358/450 |
| 5,127,047 A | 6/1992 | Bell et al. |
| 5,129,016 A | 7/1992 | Murakami et al. |
| 5,132,786 A | 7/1992 | Ishiwata |
| 5,142,304 A | 8/1992 | Sato et al. |
| 5,146,328 A | 9/1992 | Yamasaki et al. |
| 5,161,037 A | 11/1992 | Saito |
| 5,189,258 A | 2/1993 | Pratesi |
| 5,189,529 A | 2/1993 | Ishiwata et al. |
| 5,194,879 A | 3/1993 | Kotabe et al. |
| 5,198,909 A | 3/1993 | Ogiwara et al. |
| 5,204,755 A | 4/1993 | Taga et al. |
| 5,267,303 A | 11/1993 | Johnson et al. |
| 5,282,052 A | 1/1994 | Johnson et al. |
| 5,291,546 A | 3/1994 | Giler et al. |
| 5,295,181 A | 3/1994 | Kuo |
| 5,323,393 A | 6/1994 | Barrett et al. |
| 5,361,329 A | 11/1994 | Morita et al. |
| 5,448,375 A | 9/1995 | Cooper et al. |
| 5,513,013 A | 4/1996 | Kuo |
| 5,608,786 A * | 3/1997 | Gordon ...................... 370/352 |
| 5,737,395 A * | 4/1998 | Irribarren ................. 379/88.13 |
| 5,764,738 A | 6/1998 | Gillon et al. |
| 5,784,622 A | 7/1998 | Kalwitz et al. |
| 5,805,298 A * | 9/1998 | Ho et al. .................... 358/402 |
| 5,848,413 A * | 12/1998 | Wolff .......................... 707/10 |
| 5,873,077 A * | 2/1999 | Kanoh et al. .................. 707/3 |
| 5,943,137 A * | 8/1999 | Larson et al. ............... 358/403 |
| 6,057,938 A * | 5/2000 | Abe et al. ................... 358/400 |
| 6,167,439 A | 12/2000 | Levine et al. |
| 6,208,426 B1 * | 3/2001 | Saito et al. ................. 358/1.15 |
| 6,209,048 B1 | 3/2001 | Wolff |
| 6,240,445 B1 * | 5/2001 | Kumar et al. ............... 709/206 |
| 6,421,708 B2 * | 7/2002 | Bettis ......................... 709/206 |
| 6,577,409 B1 * | 6/2003 | Barker et al. ............... 358/468 |

| | | |
|---|---|---|
| 6,628,413 B1 | 9/2003 | Lee |

FOREIGN PATENT DOCUMENTS

| | | |
|---|---|---|
| EP | 0 159 158 | 10/1985 |
| EP | 0 241 273 | 10/1987 |
| EP | 0 354 703 | 2/1990 |
| JP | 57-119537 | 7/1982 |
| JP | 57-119541 | 7/1982 |
| JP | 57-192167 | 11/1982 |
| JP | 58-138148 | 8/1983 |
| JP | 58-138162 | 8/1983 |
| JP | 58-165452 | 9/1983 |
| JP | 58-175342 | 10/1983 |
| JP | 59-064956 | 4/1984 |
| JP | 59-099846 | 6/1984 |
| JP | 59-117372 | 7/1984 |
| JP | 59-117845 | 7/1984 |
| JP | 59-221165 | 12/1984 |
| JP | 60-048661 | 3/1985 |
| JP | 60-048662 | 3/1985 |
| JP | 60-048862 | 3/1985 |
| JP | 60-167566 | 8/1985 |
| JP | 60-173968 | 9/1985 |
| JP | 60-182851 | 9/1985 |
| JP | 60-194472 | 10/1985 |
| JP | 60-218961 | 11/1985 |
| JP | 61-013863 | 1/1986 |
| JP | 62-049772 | 3/1987 |
| JP | 62-132464 | 6/1987 |
| JP | 62-162551 | 7/1987 |
| JP | 63-023469 | 1/1988 |
| JP | 63-136875 | 6/1988 |
| JP | 63-178666 | 7/1988 |
| JP | 63-242060 | 10/1988 |
| JP | 63-269663 | 11/1988 |
| JP | 63-269664 | 11/1988 |
| JP | 63-269665 | 11/1988 |
| JP | 63-299573 | 12/1988 |
| JP | 64-012657 | 1/1989 |
| JP | 64-024561 | 1/1989 |
| JP | 64-050671 | 2/1989 |
| JP | 64-059210 | 3/1989 |
| JP | 64-082010 | 3/1989 |
| JP | 64-086180 | 3/1989 |
| JP | 1-138524 | 5/1989 |
| JP | 1-181373 | 7/1989 |
| JP | 2-060763 | 3/1990 |
| JP | 2-172348 | 7/1990 |
| WO | WO 9101606 A1 * | 2/1991 |

OTHER PUBLICATIONS

*Q.home by Qwest—Click to Fax*, <http://www.ghomefax.net/>, printed Nov. 2, 1999.

Poor, *WinFax Pro 9.0*, <http://www..zdnet.com/products/stories/reviews/0,4161,2132097,00.html>, printed Nov. 2, 1999.

U.S. Appl. No. 09/504,965, filed Feb. 16, 2000, Hou et al.

U.S. Appl. No. 10/625,509, filed Jul. 24, 2003, Lee.

U.S. Appl. No. 10/684,429, filed Oct. 15, 2003, Lee.

U.S. Appl. No. 10/684,430, filed Oct. 15, 2003, Lee.

Joe Mohen, "What's New With Facsimiles? Here Are a Handful of Facts." May 5, 1987, Ziff-Davis Publishing Company. 2 pages.

David H. Axner, "An Emerging Alternative to Electronic Mail," Telecommunication Products+Technology (TPT), The Magazine for Communications Management, vol. 5, No. 3, pp. 40-51 w/cover sheet.

Paula S. Stone, "Rioch Previews Trio of Facsimile Products," Copyright 1987 Info World Media Group Info World, Sep. 28, 1987, 1 page.

"Make the Right Connection . . . ," Ricoh Fax/PClink, Rapicom 2100 Asynchronous Digital Facsimile Transceiver, 3 pages.

T. Kanae, "Development of a Public Facsimile Communication System Using Storage and Conversion Techniques," 1980, IEEE, Catalog No. 80CH1539-6, pp. 19.4.1-19.4.5 w/cover sheets.

Katsuhiko Hayashi, et al., "Personal Computer Image Communications Using Facsimile," IEEE Journal on Selected Areas in Communications, vol. 7, No. 2, Feb. 1989, pp. 276-282.

Yukio Ozawa, et al., "Facsimile Mail System as Basis for Integrated Mail System," XI International Switching Symposium Florence (Italy) May 7-11, 1984, Proceedings—vol. 3, 7 pages w/cover sheet.

Toshihiko Takahashi, et al., "PC-FAX Total System," NEC vol. 39 No. 2, 1986, pp. 26-29.

Robert Conrad, et al., "Hybrid Copiers are Learning More," DM, Data Management, Park Ridge, May 1979, vol. 17, Iss. 5, p. 54, 5 pages w/cover sheet.

Phil Hirsch, "Vast Improvement in Facsimile Seen by '85," Computerworld, Framingham, Jun. 2, 1980, vol. 14, Iss. 22, p. 46, 1 cover page.

T. Hart, "The Multi-Function Work Station," Data Systems, May 1978, p. 10-11, 13, 1 cover page.

D. Nicolas, "Print-Out Devices, Yesterday, Today, and Tomorrow," Informatique et Gestion, No. 53, Dec. 1973, pp. 29-38, 1 cover page.

R. C. Pearson, et al., "Ink Jet Color Copier and Universal Printer," IBM Technical Disclosure Bulletin, vol. 16, No. 1, Jun. 1973, pp. 144-145.

T. E. Cassada, et al., "Facsimile Scanner," IBM Technical Disclosure Bulletin, vol. 15, No. 4, Sep. 1972, pp. 1401-1402.

David Steinbrecher, "Imaging Devices: From Start to Finish," Word Processing & Information Systems, vol. 8, May 1981, pp. 18-26, 2 pages.

Alan G. Rockhold, "Drawing New Boundary Lines," Infosystems, The Information Systems Magazine for Management, Jul. 1981, vol. 28, No. 7, pp. 50-56.

Charles Cohen, "Fast Laser Printer Can Store Text, Make Photocopies," Electronics International, Jun. 16, 1982, pp. 83-84.

John C. Urbach, et al., "Laser Scanning for Electronic Printing," Proceedings of the IEEE, vol. 70, No. 6, Jun. 1982, pp. 597-618.

Tibor S. Fisll, "Multifunction Document Processor," Proceedings of the SPIE—The International Society for Optical Engineering, vol. 396, 1983, pp. 20-27 w/cover sheet.

Robert A. Sprague, et al., "Advances in Laser and E-O Printing Technology," Laser Focus/Electro-Optics, vol. 19, No. 10, Oct. 1983, pp. 101-109.

Gail Siragusa, "Facsimile: On the Verge of a Breakthrough," Office Administration and Automation, vol. XLVI, No. 8, 7 pages.

Robert A. Sprague, "Improving Laser Printers with Solid-State Light Modulators," IEEE Electro Technology Review, vol. 2, 1986, pp. 99-100 w/contents.

Rick Minicucci, "Intelligent Copier/Printers: Inventing a New Breed of Machine," Today's Office, Garden City, Dec. 1986, vol. 21, Iss. 7, p. 19, 1 page.

Shelley Bakst, "Need for Fast Information Spurs New Interest in Fax," The Office, Stamford, Sep. 1987, vol. 106, Iss. 3, p. 116, 3 pages w/cover sheet.

Bonnie Canning, "The Future of Office Automation," IMC Journal, Boulder: Jan./Feb. 1988, vol. 24, Iss. 1, p. 9, 1 page.

Laurence Hooper, "Hydra' Evolves to Merge Fax, Printer, Copier," The Wall Street Journal, Copyright 1990, Dow Jones & Co., Inc. 4 pages.

J. Hayes, "Office Automation and the Multi-Function Work Station," Proceedings of the 1984 South East Asia Regional Computer Conference, pp. 28/1-8, 1 page.

W. Scott Osterman, "Driven by an Image," Agenda '95 Itinerary, Mar. 8-10, 1995, 72 pages.

Murakami, "Facsimile, A New Communication Media," Denki Tsushin Gijutu News 1981 wth English translations of the drawings thereof, pp. 247-275.

* cited by examiner

FAX JOB LOG

| Job Number | Status | Date | Time | Receiver'sName | Fax Number | Sender's Email | Job ID | Comment |
|---|---|---|---|---|---|---|---|---|
| 0001 | OK | 09/28/99 | 17:28:01 | Sir | 9545353 | hou@fax.ussj.ricoh.com | fax00001 | |
| 0002 | OK | 09/28/99 | 17:28:20 | Sean | 4345390 | she@fax.ussj.ricoh.com | fax00001 | |
| 0003 | OK | 09/28/99 | 17:30:01 | Jerry | 15111345390 | hou@fax.ussj.ricoh.com | fax00001 | |
| 0004 | OK | 09/28/99 | 17:31:23 | Jack | 9545353 | shen@fax.ussj.ricoh.com | fax00001 | |
| 0005 | ERROR | 09/28/99 | 17:31:30 | John | 434-5390 | hou@fax.ussj.ricoh.com | fax00001 | ERR=01 |
| 0006 | OK | 09/28/99 | 17:40:01 | Ken | 19121224567 | hou@fax.ussj.ricoh.com | fax00001 | |
| 0007 | OK | 09/28/99 | 17:40:02 | Kim | 9545353 | shen@fax.ussj.ricoh.com | fax00002 | |

*FIG. 5*

NETWORK FAX MACHINE USING A WEB PAGE AS A USER INTERFACE

BACKGROUND OF THE INVENTION

1. Field of the Invention

The present invention relates generally to a network fax machine and more specifically to an embedded fax server that faxes files received from a remote client.

2. Discussion of the Background

A conventional fax machine requires a user to leave his or her desk to physically carry a document to be faxed to the fax machine. Since many documents are stored electronically, methods for sending faxes from a personal computer (PC) have been developed. This has eliminated the requirement that users physically carry documents to be faxed to a fax machine, saving both time and money.

Examples of popular PC fax applications are Symantec Corp.'s WINFAX PRO 9.0 and the Computer Associates' BITWARE 4.0. PC fax applications permit documents electronically stored on a PC to be faxed via a modem attached to the PC. However, PC fax applications are for single users and are not a network fax solution. Additionally, PC fax software has to be individually installed on each PC, a modem is required for each PC, and users are required to connect their modem to a conventional public switched telecommunications network (PSTN) and set the modem settings.

Internet or local area network (LAN) fax machines, such as the Ricoh 4800L, can be connected to a LAN. Internet fax machines permit a client PC to send Group 3 (G3) fax messages to the Internet fax machine over the LAN. The Internet fax machine then sends the fax message to a destination such as a G3 fax machine connected to a PSTN or an e-mail address. However, conventional Internet fax machines require PC fax software such as WINFAX, and a COM redirector driver, which redirects fax messages from the PC fax software to an ETHERNET card rather than the COM port. Thus, use of conventional Internet fax machines requires installation of specialized software on each PC.

Windows NT and Unix fax servers have developed rapidly since the T.37 Internet Fax Standards were approved by the ITU-T (International Telecommunications Union-Telecommunications Sector) in June 1998. The T.37 recommendations define the service, file formats and addressing methods for the "Simple Mode" of Internet Fax via e-mail as RFCs (Request for Comments) 2301–2305. The Fax Server is usually directly integrated with the e-mail server and works as a gateway between Internet e-mail and G3 facsimile. The fax server retrieves the fax messages from the message queue of the e-mail server and sends the attachments as well as text messages to the destination via the PC fax modems. Some vendors (e.g., Biscom Corporation) have also developed Web page user interfaces for their fax servers. The fax server allows all network users to send and receive faxes right from their desktop. However, an extra workstation (e.g., NT or Unix workstation) is required to run the fax server. The addressing methods for Internet Fax is not intuitive and requires training in order to use Internet fax services. For example, the Internet fax message addressing syntax "Fax=/num=1408-954-5353/name=John@faxserver.com" indicates that a fax is to be sent to 1408-954-5353. The intended receiver is John, and "faxserver.com" is the domain name of the fax server. Some fax servers are inconvenient to use because they require fax client software to be installed on each user's PC before he can use the fax services. The fax servers do not provide any means for a user to directly fax a hardcopy of a document to a fax number as a normal G3 fax machine does.

Printer servers have been implemented to allow administrative tasks to be remotely executed via a hyper text transfer protocol (HTTP) server resident on a printer. For example, Hewlett Packard's HP LaserJet 8100 series printers include HTTP servers. However, such HTTP servers are merely provided so that a user can access configuration and diagnosis information (e.g., network status, device identification, system configuration, security, diagnosis, and technical support) from a remote client connected to the HTTP server. Such HTTP servers do not provide direct printing services via a Web browser running on a client connected to the HTTP server.

SUMMARY OF THE INVENTION

Accordingly, one object of the present invention is to provide a novel network fax machine that includes a hyper text transfer protocol (HTTP) server.

Another object of the present invention is to provide a fax server, method, and software for providing a fax service through a Web page user interface.

It is yet another object of the present invention to provide a network fax machine having an HTTP server with a uniform resource locator (URL) that enables users to immediately access the network fax machine over a network such as the Internet, upon entering the URL at a client workstation.

It is an even further object of the present invention to provide a fax server, method, and software for sending fax messages through a network fax machine that eliminates the need for installing PC fax software and PC fax hardware, such as a fax modem.

It is still yet another object of the present invention to provide a fax server, method, and software which enables computers installed on a network to immediately access a network fax machine as soon as the network fax machine is installed on the network because the computers do not have to be altered.

These and other objects are achieved according to the present invention by providing 15=a novel network fax machine, method, and software for faxing files received from a remote client. The network fax machine includes a server unit and a fax control unit. The server unit provides an HTML document form to a remote client and receives a fax request from the remote client. The fax request includes an identifier corresponding to a destination fax machine and zero or more attached files to be faxed to the destination fax machine. The fax control unit is configured to use the identifier to connect the network fax machine to the destination fax machine and is configured to send the file to the destination fax machine by facsimile communication. Since fax document forms are sent from the network fax machine to the client, there is no need to install fax software on the client. Further, there is no need to install fax hardware, such as a fax modem, if the client and server are connected by a network.

Preferably, the server unit is an HTTP server configured to serve a hypertext markup language (HTML) document to the remote client. In this case, the HTML document can include the fax document form sent to the remote client. Accordingly, the present invention provides a fax service through a Web page user interface. Moreover, the HTTP server has a URL, which permits users to immediately access the network fax machine over a network such as the Internet.

In a preferred embodiment, the network fax machine includes a network interface card programmed to provide the HTTP server. Additionally, the network interface card can be programmed to provide a common gateway interface (CGI) application and a fax job manager. The CGI application is configured to read and parse the fax information received by the server unit, and the fax job manager is configured to convert the file to be faxed into a facsimile format.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 is a GUI providing a fax job log as a Web page served to the Web client of FIGS. 1, 2, and 3, by the HTTP server of FIG. 3;

DETAILED DESCRIPTION OF THE PREFERRED EMBODIMENTS

Figure 1:
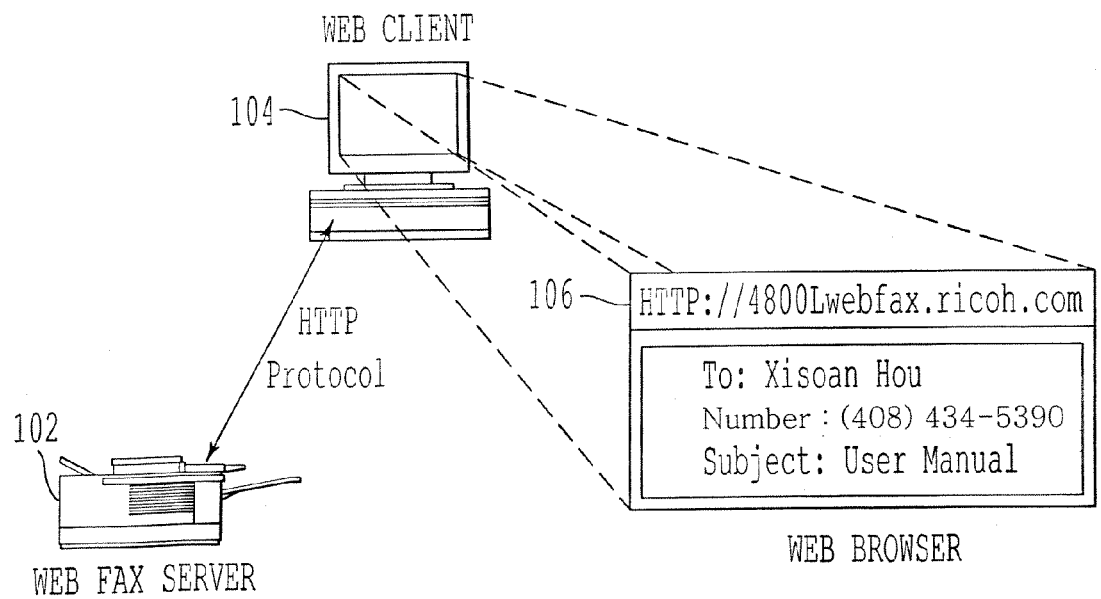
FIG. 1 is a schematic illustration showing a Web fax server embedded in a G3 fax machine according to the present invention and in communication with a client or a PC running Web browser software.

Referring now to the drawings, wherein like reference numerals designate identical or corresponding parts throughout the several views, and more particularly to FIG. 1 thereof, there is shown a Web fax server 102, a Web client 104, and a expanded screen shot 106 provided by a graphical user interface (GUI) of the Web client 104, using Web browser software. The terms "Web fax server" and "network fax machine" are used interchangeably to describe a fax machine that includes an embedded fax server.

The Web fax server 102 and the Web client 104 are connected and communicate in a client/server relationship. Thus, the Web fax server 102 and the Web client 104 can advantageously make use of distributed intelligence and processing. The Web fax server 102 performs all of the functions of a traditional fax machine. These traditional functions include scanning images from documents, converting the scanned images into digital data, sending the digital data to a fax machine over a network, receiving digital data from a fax machine, converting the digital data to an image, and printing the image on paper.

As shown in FIG. 1, the Web fax server 102 and the Web client 104 communicate using hypertext transfer protocol (HTTP); however, the Web fax server 102 and the Web client 104 may communicate using any suitable network protocol language or application level protocol for distributed systems. Preferably, the protocol used by the Web fax server 102 and the Web client 104 permits transfer of hyper medium information.

Accordingly, the present invention can be implemented on the World Wide Web or any other suitable network or medium for transferring files between a server and a client connected to a network. The design and implementation of various methods of database networking and Internet communications are described in Liu et al., "Managing Internet Information Services," O'Reilly & Associates, Inc., 1994; Corner, "Internet Working with TCP/IP Volume I: Principles, Protocols, and Architecture," $2^{nd}$ ed., Prentice-Hall, Inc., 1991; Corner and Stevens, "Internet Working with TCP/IP Volume II: Design, Implementation, and Internals," Prentice-Hall, Inc., 1991; Corner and Stevens, "Internet Working with TCP/IP Vol. III: Client-Server Programming and Applications," Prentice-Hall, Inc., 1993; Khoshafian et al., "A Guide to Developing Client/Server SQL Applications," Morgan Kaufmann Publishers, Inc.; Hamilton et al., "JDBC Database Access with Java, A Tutorial and Annotated Reference," Addison-Wesley Pub. Co., 1997; and Francis et al., "Professional Active Server Pages 2.0," Wrox Press Ltd., 1998; each of which is incorporated by reference herein.

The Web client 104 is a personal computer (PC), mini-computer, workstation, or other computer or processor for sending information to the Web fax server 102 and for receiving files and other information from the Web fax server 102.

The display screen 106 is generated with a Web browser application or software running on the Web client 104. The Web browser application causes Web pages (or hypertext markup language (HTML) pages) downloaded from the Web fax server 102 to be displayed on the screen of the Web client 104.

Figure 2:
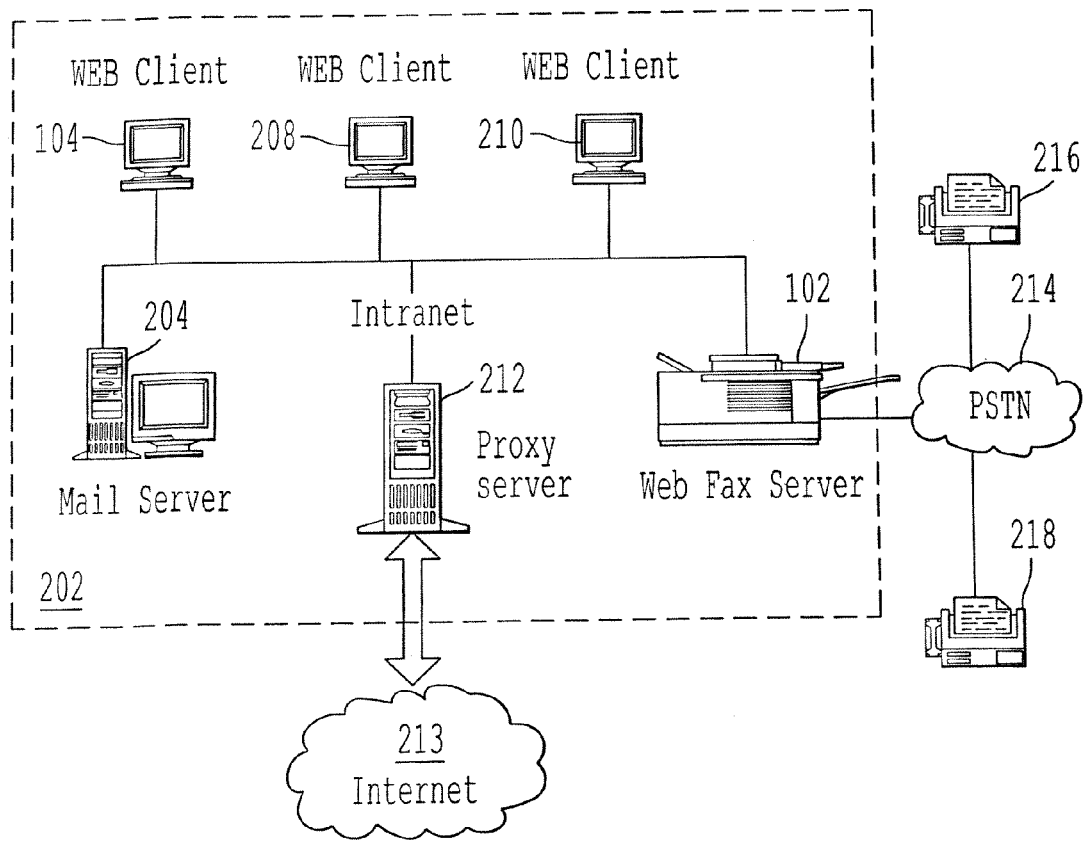
FIG. 2 is a schematic illustration of an exemplary network on which the Web fax server of FIG. 1 can be implemented.

FIG. 2 is an exemplary schematic diagram showing how the Web fax server 102 is integrated within an intranet 202. The intranet includes the Web client 104, a Web client 208, a Web client 210, a mail server 204, the Web fax server 102, and a proxy server 212.

The Web clients 208 and 210 are any processing device (e.g., a mini-computer, PC, or workstation) and can be the same or different from the Web client 104. As shown in FIG. 2, the intranet 202 also includes a mail server 204 and a proxy server 212 for interfacing the intranet 202 with the Internet 213. The Web client 104, the Web client 208, the Web client 210, the mail server 204, the proxy server 212, and the Web fax server 102 are all in communication with one another over the intranet 202. The Web fax server 102 is connected to a public-switched telephone network (PSTN) 214 and/or any other network or connection over which fax messages are transmitted.

Fax machines 216 and 218 are connected to the PSTN 214. The fax machines 216 and 218 are conventional fax machines or alternatively configured as Web fax servers, such as the Web fax server 102. The fax machines 216 and 218 communicate with each other and the Web fax server 102, using Group 3 (G3) protocols or any other suitable protocol.

Figure 3:
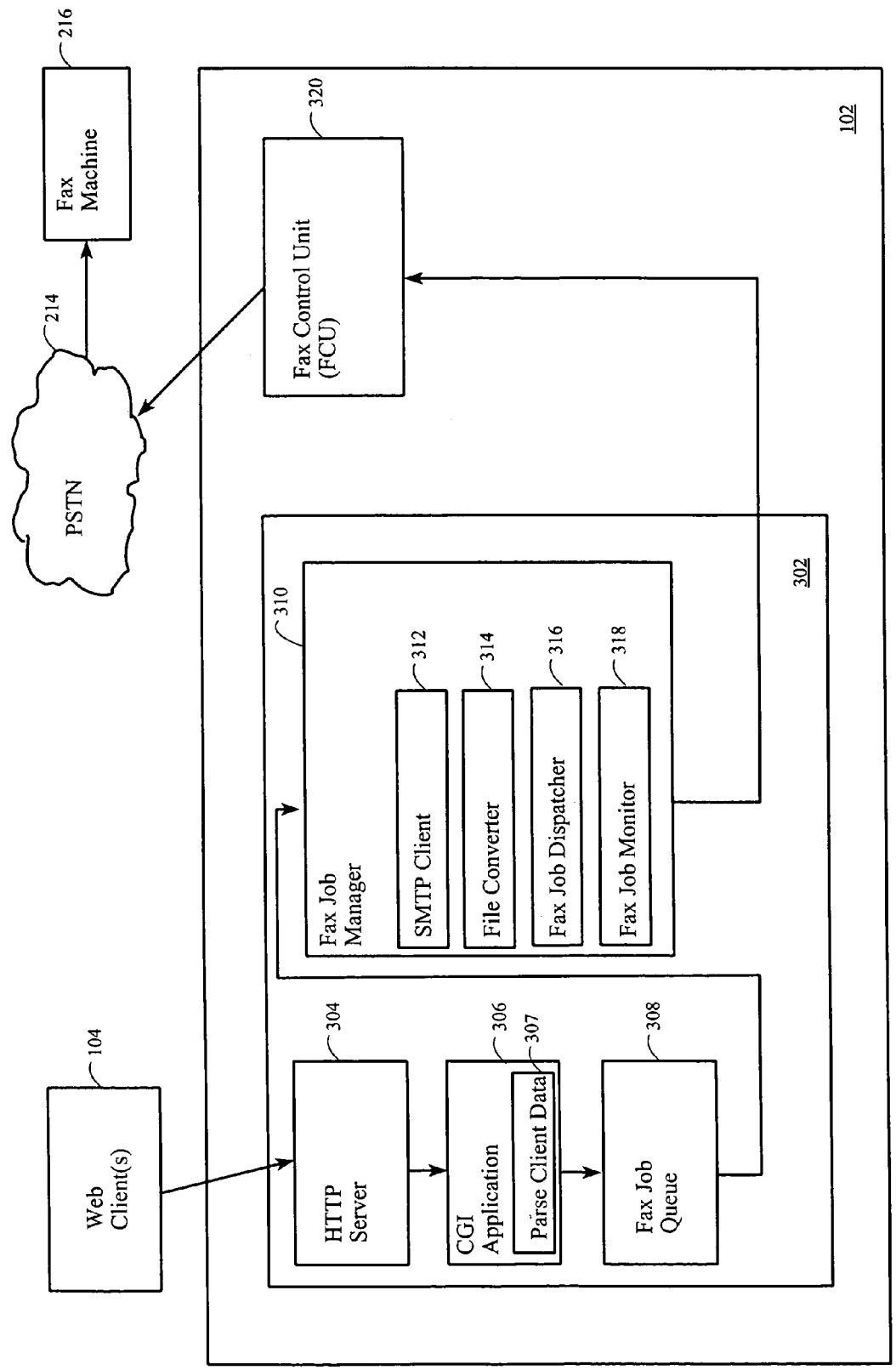
FIG. 3 is a schematic illustration of the internal components of the Web fax server of FIGS. 1 and 2 and of the interrelationship between the Web client, a public switched telecommunications network (PSTN), a normal G3 fax machine, and the internal components of the Web fax server.

FIG. 3 is an exemplary schematic diagram of the Web fax server 102 and the connections between the Web client 104, the Web fax server 102, the PSTN 214, and the fax machine 216.

Figure 4:
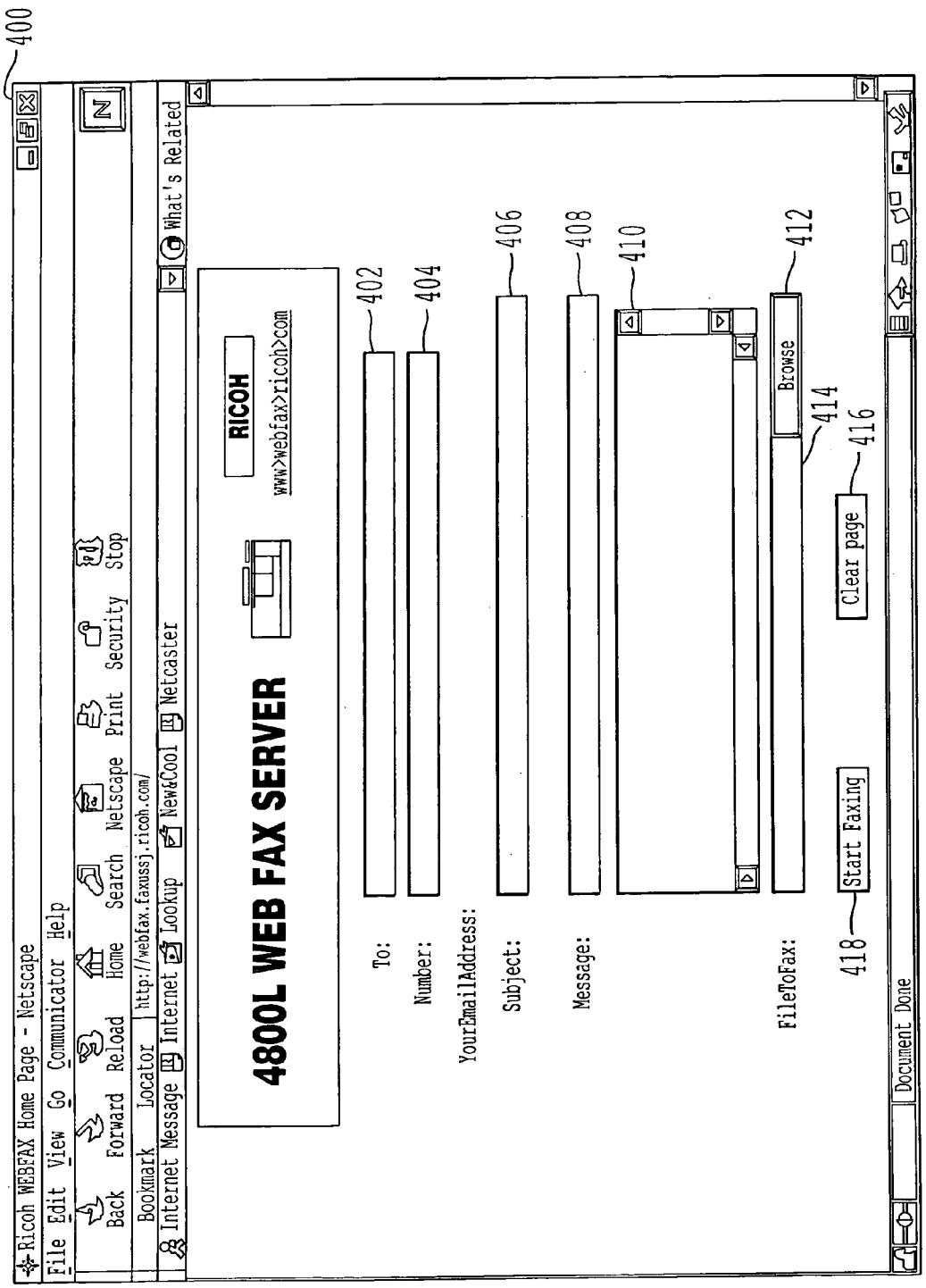
FIG. 4 is a graphical user interface (GUI) for providing a fax document form as a Web page served to the Web client of FIGS. 1, 2, and 3 by the HTTP server of FIG. 3.

As noted above, the Web client 104 is a workstation, PC, computer, mini-computer, or other processing device that functions as a client in a client/server architecture arrangement. Web browser software or applications are running on the Web client 104 and provide a GUI for the user to enter fax requests. A fax request includes information such as the name of the intended recipient of the fax, the fax number of the destination fax, the e-mail address of the sender, the subject of the fax, a message, and zero or more attached files to be faxed to the destination fax machine. If zero files are attached, the user can still send text messages by typing text messages in the text message box of the field 410 (FIG. 4). The files to be faxed may be stored on the Web client 104 or remotely from the Web client 104. The Web client 104 preferably communicates with the Web fax machine 102 using HTTP protocol, as noted above.

In a preferred embodiment, the Web fax server 102 is a Ricoh 4800L fax machine that includes a network interface card (NIC) 302 and a fax control unit (FCU) 320.

The NIC card 302 is programmed to function as a Web server. The software used to program the NIC card 302 includes the following four software modules: an HTTP server 304; a common gateway interface (CGI) application 306; a fax job queue 308; and a fax job manager 310. The fax control unit 320 communicates with the fax job manager 310 and controls the delivery of fax messages to the fax machine 216 via the PSTN 214.

The HTTP server 304 supports connections with multiple clients (e.g., the Web client 104) and/or multiple Web browsers. The HTTP server 304 generates and sends a Web fax home page to the Web client 104. The Web fax home page is a fax document form used to collect fax information input by a user via a Web browser GUI. The HTTP server 304 also launches the CGI application 306 when fax information from the Web client 104 arrives at the HTTP server 304. Additionally, the HTTP server 304 sends back the server processing status to the Web client 104.

The CGI application 306 unpacks and processes fax information sent to the HTTP server 304 from the Web client 104. CGI is a known standard for external gateway programs to interface with information from servers. The CGI application could be written in any software language that can read standard input (STDIN), write to standard output (STDOUT), and read environment variables, for example. Thus, the CGI application could be written in C, C++, PERL, or with shell scripting, for example. The CGI application 306 reads streams of client data (e.g., fax information retrieved via the fax document form) through the standard input and parses the streams of client data. Additionally, the CGI application 306 stores variable values into data structures and writes the fax information (e.g., subject, message, and attached binary files) into temporary files. The attached binary files are the documents that are to be faxed from the web client. The CGI application 306 also enters fax messages, received as streams of client data from the HTTP server 304, into the fax job queue 308.

The fax job queue is an application, program, or a script implemented as a text file, for example. If the fax job queue 308 is a script implemented as a text file, then each fax job to be sent can be represented as a single line of the text file. Thus, each line in the text file corresponds to one fax job and contains at least eight fields. These fields are date, time, receiver's name, sender's email address, temporary subject file path and name, temporary message file path and name, temporary attached file path and name. The temporary files can be stored anywhere. By default, they would be stored in the same directory as the fax job queue file. For example, following is one line of text in the fax job queue file representing one fax job:

Nov. 30, 1999, 15:01:50, Sean Hou, 954-5353, hou@fax.ussj.ricoh.com,
d:\Httpd\Faxjob\fax00001.sub,
d:\Httpd\Faxjob\fax00001.msg,
d:\Httpd\Faxjob\fax00001.doc The fields are separated by commas. The date is 11/30/99, the time is 15:01:50, and the intended receiver is Sean Hou. The destination fax number is 954-5353. The sender's email address is hou@fax.ussj.ricoh.com. The temporary subject file is d:\Httpd\Faxjob\fax00001.sub. The temporary message file is d:\Httpd\Faxjob\fax00001.msg. The temporary attached file is d:\Httpd\Faxjob\fax00001.doc. The file extension ".sub" denotes the temporary subject file, which stores the subject the user entered in his fax request. The file extension ".msg" denotes the temporary message file, which stores the text message the user entered. The file extension ".doc" denotes the temporary MS Word file, which is attached to be faxed.

The fax job temporary files are automatically generated by the computer program. The program first tries to detect if fax00001.* exists or not. If yes, the temporary file name to be used by the next fax job is automatically advanced by 1. Thus, the temporary file name for the next fax job would be fax00002.sub, fax00002.msg, or fax00002.doc, for example, assuming fax00002.* does not already exist. If fax00002.* does exist, the next fax job temporary file name would be fax00003 plus the file extension. The fax job temporary files are continuously named in such a way until the last name fax99999 is designated. The fax job temporary files are immediately deleted once the fax job has been executed by the fax job manager 310, so that the same temporary file name will be immediately available for the next fax job to use. The fax job queue 308 operates on a first-in-first-out (FIFO) basis, so that new fax jobs are attached at the end of the fax job queue 308.

The fax job manager 310 includes the following software modules: a simple mail transfer protocol (SMTP) client 312, a file converter 314, a fax job dispatcher 316, and a fax job monitor 318. The fax job dispatcher 316 runs a fax job dispatching timer with a time interval. At the end of each time interval, the fax job dispatcher 316 reads the first fax job from the fax job queue 308. For example, if the time interval of the fax job dispatching timer is every five seconds, then every five seconds, the fax job dispatcher 316 reads the first fax job from the fax job queue 308.

The file converter 316 is a file conversion engine for converting different types of file formats into fax-ready formats. For example, the file converter 314 receives a Microsoft WORD file and then converts it to a Group 3 TIFF format file. The fax job dispatcher 316 uses the file converter 314 to translate an attached file into fax-ready format. Thus, a user may select any type of file to fax, for example, Microsoft WORD files, POWERPOINT files, EXCEL files, Adobe ACROBAT files, etc. File extensions are used by the file converter 314 to determine the type of file. After conversion, the fax job dispatcher 316 dispatches the fax job to the fax control unit 320.

The fax job monitor 318 keeps a log of fax job activities of the Web fax server 102 and generates for display a list of fax jobs that have been dispatched. The list of fax jobs are delivered to the Web client 104 in the form of a Web page, such as the fax job log 500 (FIG. 5). The fax job log 500 is preferably delivered to the user at the Web client 104 at the request of the user.

This invention includes the computer screen interface and the associated program used to generate the interface (e.g., a GUI), which is used for interaction with people (i.e., users) who are associated with and carry out the operation of the invention. For example, the inputs of the invention are entered through the user interface of the screen, and the outputs are displayed on the screen and/or generated on printed paper.

FIG. 4 is a GUI implemented as a Web fax home page 400. The Web fax home page 400 is displayed by a Web browser, such as NETSCAPE, running on a client (e.g., the Web client 104). The Web fax server home page 400 includes a field 402, a field 404, a field 406, a field 408, a field 410, a field 412, a field 414, a field 416, and a field 418. The field 402 is for inputting the name of the receiver of the fax message. The field 404 is for inputting the telephone number of the fax machine of the receiver (i.e., the destination fax machine 216). The field 406 is for inputting the e-mail address of the sender. The field 408 is for inputting the subject of the fax message. The field 410 includes a text message box for inputting a message and scroll bars for scrolling through messages that do not fit entirely within the message field. The field 412 is a button, which allows a user to browse a storage device connected to the Web client 104 for files to be sent as fax messages. Such storage devices may include hard disk drives, floppy disk drives, network databases, or any other suitable medium for storing files to be sent by facsimile communication to the fax machine 216. The field 414 is for manually inputting a file to be faxed. The field 416 clears the inputs contained in the fields 402, 404, 406, 408, 410 and 414. The field 418 is a button, which when selected, causes the fax message, including fax information to be sent to the HTTP server 304 from the Web client 104.

FIG. 5 shows a fax job log 500 sent to the Web client 104 from the HTTP server 304 in the form of a Web page. The fax job log 500 includes a field 502, a field 504, a field 506, a field 508, a field 510, a field 512, a field 514, a field 516, and a field 518, which are arranged in a single record. The field 502 displays the fax job number. The field 504 displays the status of the fax job (e.g., whether the fax message was sent successfully by the fax control unit 320 or whether an error occurred). The field 506 displays the date that the fax was sent by the fax control unit 320. The field 508 displays the time that the fax message was sent by the fax control unit 320. The field 510 displays the name of the intended receiver of the fax message. The field 512 displays the fax number of the destination fax machine 216. The field 514 displays the e-mail address of the sender. The field 516 displays the fax job ID. The fax job ID is used in generating the temporary fax job files for a particular fax job, which is useful for software debugging. The field 518 displays comments, if any, corresponding to each fax job number stored in the field 502. Thus, as shown in FIG. 5, fax job number 0005 was sent Sep. 28, 1999, at 17:31:30 to John at fax number 434-4390. The sender's e-mail was hou@fax.ussj.ricoh.com. As shown in field 504, an error occurred, and the fax job ID displayed in field 516 is fax00001. In the field 518 the error message "ERR=01" is displayed, indicating that the error code for the error is 01. The error code 01 corresponds to a particular type of error identified in a manual or on an on line help screen, for example.

Figure 6:
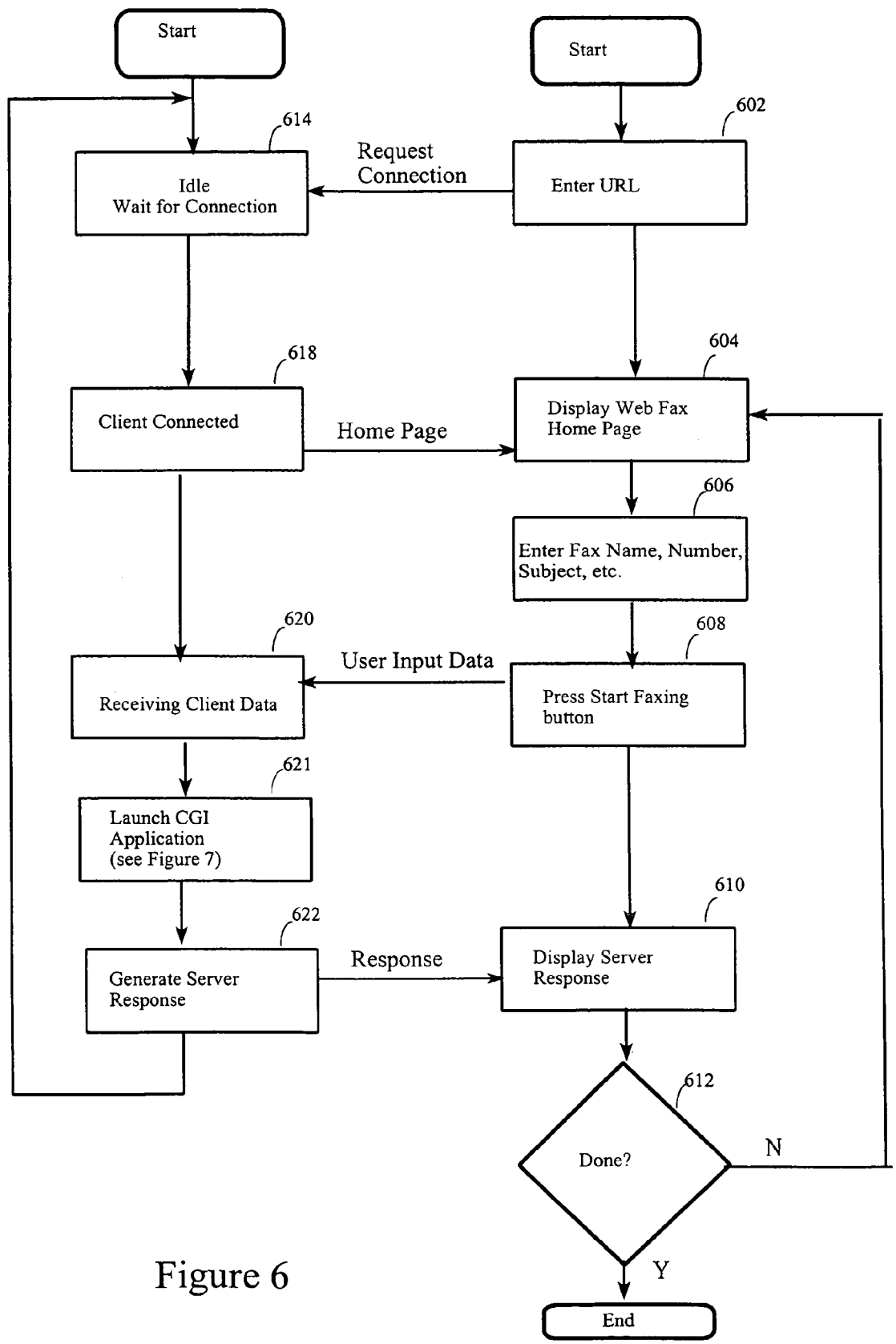
FIG. 6 is a flow chart explaining how fax requests are made and confirmed using the Web browser of FIG. 1 and the HTTP server of FIG. 3.

FIG. 6 is a flowchart showing how the Web client 104 and the HTTP server 304 operate in parallel to provide a Web fax service. Steps 602, 604, 606, 608, 610, and 612 are performed on the Web client 104, which is preferably an HTTP client running Web browser software that displays Web pages served by the Web fax server 102. Steps 614, 616, 618, 620, 621, and 622 are performed by the HTTP server 304.

First, the processing of the Web client 104 is described. In step 602 a user at the Web client 104 enters the URL or IP Address corresponding to the Web fax server 102. Once the Enter button is pressed in step 602, the Web client 104 will attempt to connect to the HTTP server 304 of the Web fax server 102. Once the Web client 104 connects to the HTTP server 304, the Web client 104 displays a fax document form (e.g., the Web fax home page 400) received from the HTTP server 304. Then, in step 606 the user enters information into some or all of the fields 402, 404, 406, 408, 410, and 414 displayed on the Web fax home page 400.

The user sends the information input in step 606 to the HTTP server by selecting (i.e., clicking on) the button in field 418 of the Web fax home page 400. After the user input data is received and processed by the HTTP server 304, in step 610 the Web client 104 displays the response of the HTTP server 304. Such responses include an indication whether the fax request was successfully received. The user will receive an e-mail reporting his fax status if he has entered his e-mail address into the field 406. In step 612, the user is prompted by the Web client 104 whether there are additional fax messages to be sent. Such prompting can be performed with a Web page sent to the Web client 104 from the HTTP server 304. If the user has finished sending fax messages, then the process ends. If the user indicates that additional fax messages are to be sent, then the process returns to step 604.

Next, the processing of the HTTP server 304 is described with reference to steps 614, 618, 620, 621, and 622. In step 614, the HTTP server 304 is idle and waits for a connection. Upon receiving a request for a connection from the Web client 104, the HTTP server 304 connects to the Web client 104 and sends the Web fax home page 400 to the Web client 104. In step 620 the HTTP server 304 receives user input data including information such as the receiver's name, the receiver's fax number, the subject of the fax, and/or any other information input by the user into the Web fax home page 400 in step 606. After receiving the user input data in step 620, the HTTP server 304 launches the CGI application 306 in step 621. The CGI application 306 is described in further detail below with reference to FIG. 7. In step 622, the HTTP server 304 generates the server response and sends the server response to the Web client 104 in the form of a Web page. Then, the process returns to step 614.

Figure 7:
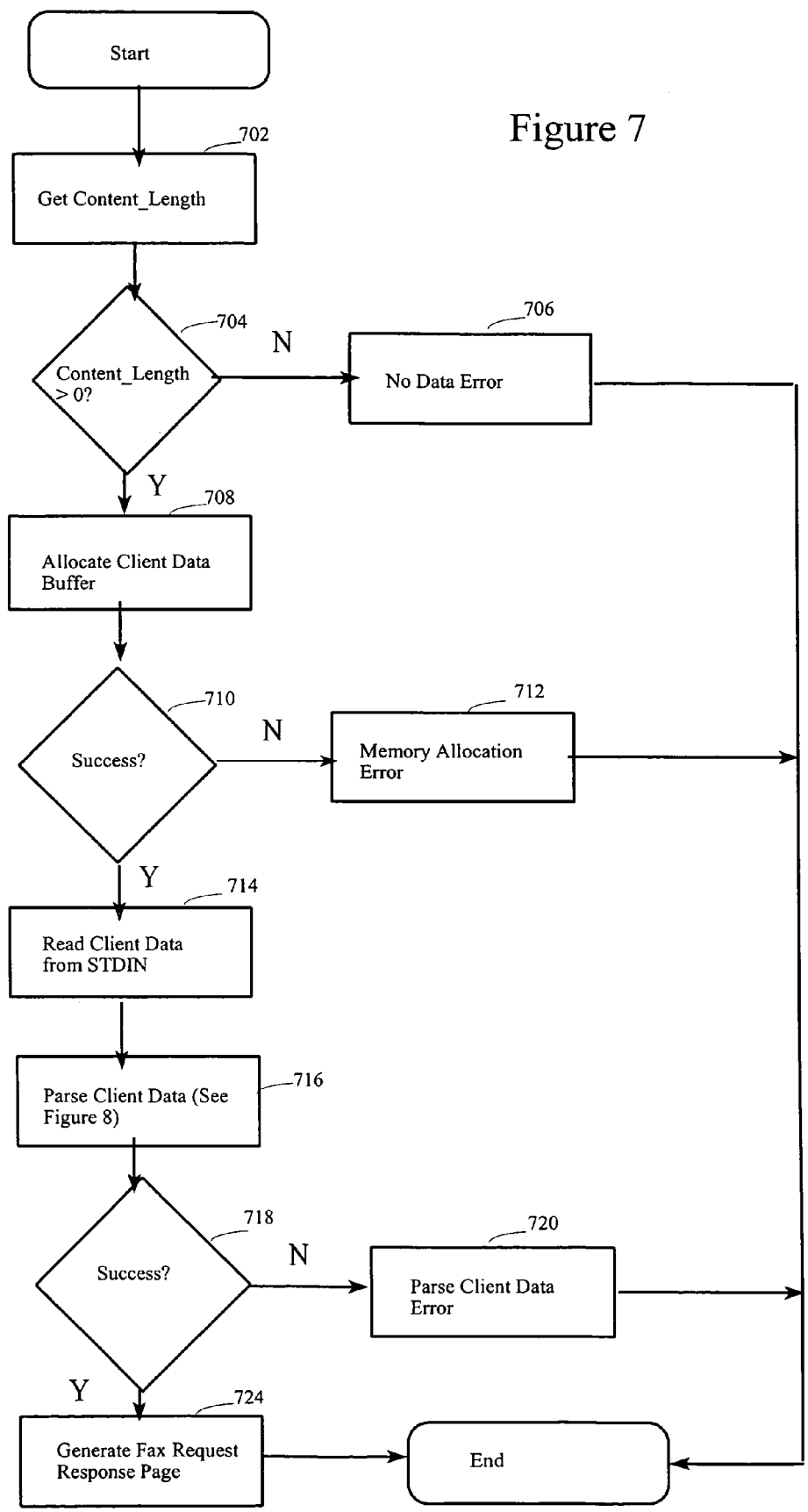
FIG. 7 is a flow chart explaining the operation of the common gateway interface (CGI) application used in the Web fax server of FIGS. 1, 2, and 3.

FIG. 7 is a flowchart explaining the operation of the CGI application 306. The CGI application 306 is programmed and implemented using any suitable compiler, such as a C++ compiler. In step 702, the CGI application 306 determines the size of the client data in bytes. The size of the client data in bytes is represented by the environment variable CONTENT LENGTH. If a C++ compiler is used, the original value of content length is a character string obtained through the standard library call getenv( ). Then, the string value of CONTENT_LENGTH is converted to an unsigned long integer using the standard library call atoul( ).

In step 704, the CGI application 306 compares the integer value of CONTENT LENGTH to zero. If the integer value of CONTENT_LENGTH (i.e., the client data size in bytes) equals zero, then a "no data error" message is reported to the HTTP server 304 in step 706. If the integer value of CONTENT_LENGTH is greater than zero, then in step 708 the CGI application 306 allocates a memory buffer of a size at least as great as the client data size. Then, in step 710 the CGI application 306 determines whether the allocation of the memory buffer was successful. If the allocation of the memory buffer is unsuccessful, then in step 712 the CGI application 306 generates a "memory allocation error" message, which is sent to the HTTP server 304. If the allocation of the memory buffer is successful, then in step 714 the CGI application 306 calls a low level I/O routine to read the client data from the standard input. Once the client data is read into the memory buffer, the memory buffer is passed as a parameter to a parse client data module, which is described in further detail below with reference to FIG. 8. If the CGI application 306 is unsuccessful in parsing the client data, then in step 720 a "parse client data error" message is generated and sent to the HTTP server 304. If the CGI application 306 successfully parses the client data, then in step 724 the CGI application generates a server response, which is preferably in HTML. As noted above, in step 622 (FIG. 6) the HTTP server 304 sends the server response to the user to the Web client 104, which displays the server response in step 610.

Figure 8:
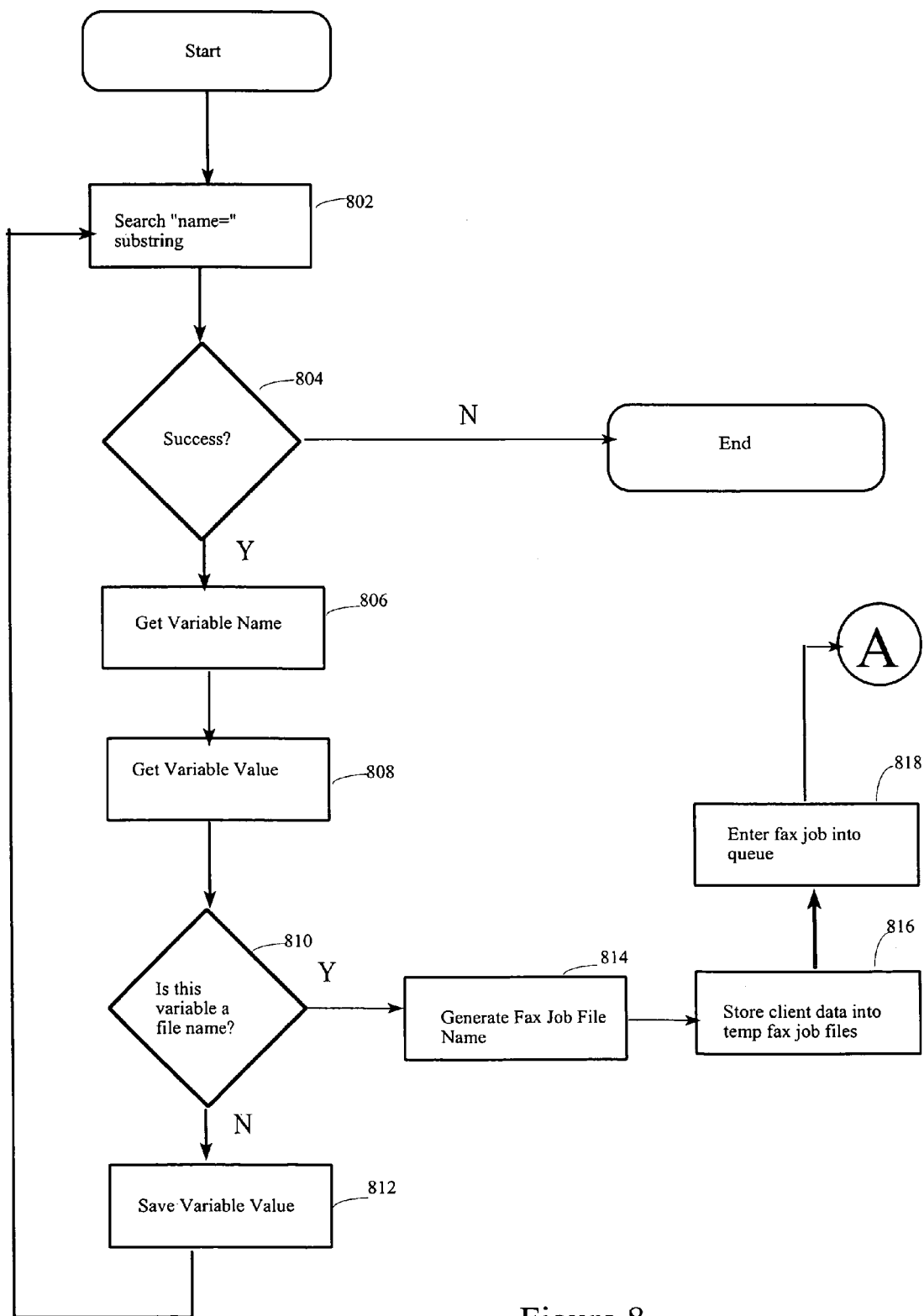
FIG. 8 is a flow chart explaining the operation of the parse client data module of the CGI application shown in FIG. 3.

FIG. 8 is a flowchart showing how the parse client data module 307 of the CGI application 306 parses client data. The present example assumes that client data is received in a stream separated by "name=" substrings. In step 802, parse client data module 307 finds the next "name=" substring in the client data stream. In step 804, the parse client data module 307 determines whether a "name=" substring was found in the client data stream. If a "name=" substring is not found in the client data, then the process ends. If a "name=" substring is found in the client data stream, then in step 806 the parse client data module 307 retrieves the value of the variable name. Then, in step 808 the parse client data module 307 identifies the value corresponding to the variable name in the client data stream and stores the variable value in any suitable data structure. In step 810, the parse client data module 307 determines whether the variable value of the name is a file name. If the variable value is not a file name, then in step 812 the parse client data module 307 saves the variable value in a data structure, and the process returns to step 802. If the parse client data module 307 determines that the variable value retrieved in step 808 is a file name, then in step 814 the parse client data module 307 generates a fax job file name. Then, in step 816 the parse client data module 307 unpacks the file associated with the file name and stores the client data into temporary fax job files. Then, in step 818 the parse client data module 307 enters the user's fax request into the fax job queue. Thus, the parse client data module 307 opens the fax job queue file and appends a new line of text in that file.

Figure 9:
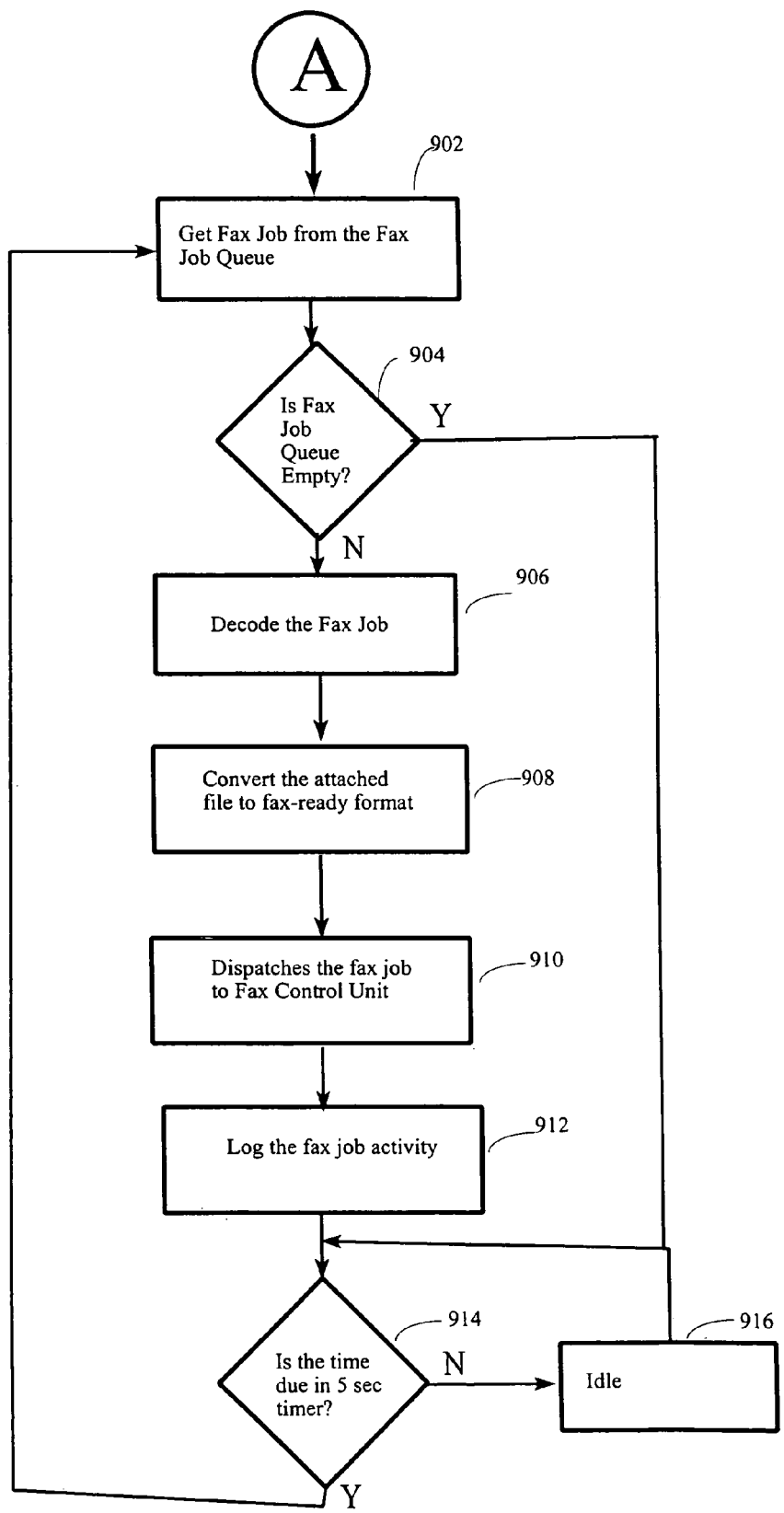
FIG. 9 is a flow chart explaining the operation of the fax job manager used in the Web fax server of FIGS. 1, 2, and 3.

FIG. 9 is a flowchart showing the processing performed by the fax job manager 310 after one or more fax jobs are entered into the fax job queue 308 in step 818. In step 902, the fax job dispatcher 316 reads the fax job queue file and retrieves the first fax job from the fax job queue 308. Then, in step 904 the fax job manager 310 determines whether the fax job queue 308 is empty. If the fax job queue 308 is not empty, in step 908 the file converter 314 decodes the fax job in step 906 and converts the attached file to a fax ready format. Then, in step 910, the fax job dispatcher 316 dispatches the fax job to the fax control unit 320. Additionally, the SMTP client 312 sends back the fax job processing status (e.g., "successfully sent," "error," etc.) to the e-mail address (in the field 406) of the user of the Web client 104. In step 912 the fax job monitor logs the fax job log 500.

Then, in step 914, the fax job dispatcher 316 determines whether the predetermined time interval has expired. If the predetermined time interval has not expired, then in step 916 the fax job dispatcher 316 remains idle. If the predetermined time interval has expired then the process returns to step 902 and the fax job dispatcher 316 retrieves the first fax job from the fax job queue 308. Referring back to step 904, if the fax job dispatcher 316 determines that the fax job queue 308 is empty, then the process proceeds to step 914 and the fax job dispatcher 316 remains idle until the next predetermined time interval has expired.

All or a portion of the invention may be conveniently implemented using conventional general purpose computers or microprocessors programmed according to the teachings of the present invention, as will be apparent to those skilled in the computer art. Appropriate software can be readily prepared by programmers of ordinary skill based on the teachings of the present disclosure, as will be apparent to those skilled in the software art.

Figure 10:
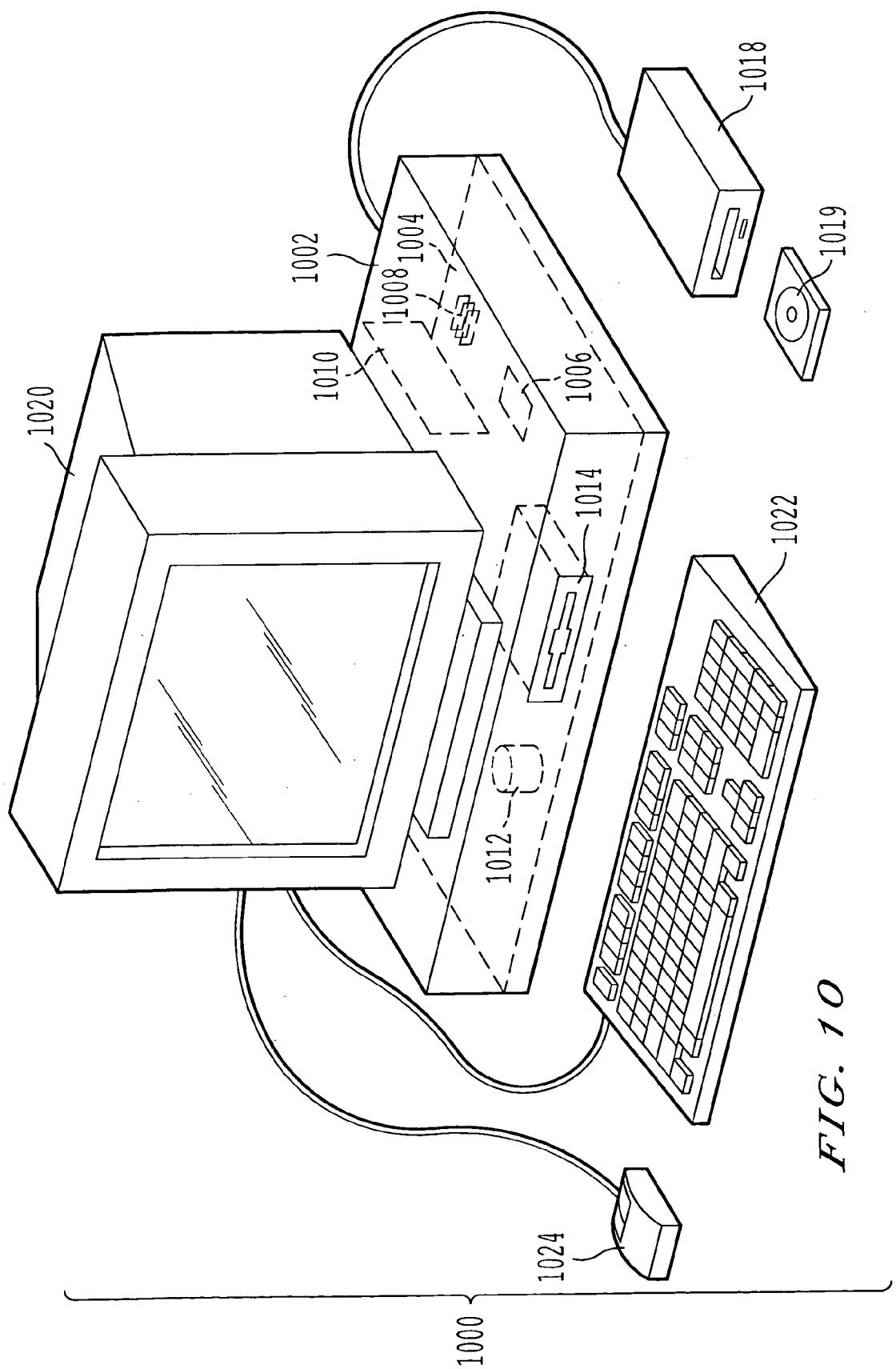
FIG. 10 is a schematic diagram of a general purpose computer system that can be programmed to perform the special purpose function(s) of one or more of the devices shown in FIGS. 1, 2, and 3.

FIG. 10 is a schematic illustration of a computer system 1000 for implementing the method of the present invention. The computer system 1000 includes a computer housing 1002 for housing a mother board 1004, which contains a CPU 1006, a memory 1008 (e.g., random access memory (RAM) dynamic RAM (DRAM), static RAM (SRAM), synchronous DRAM (SDRAM), flash RAM, read-only memory (ROM), programmable ROM (PROM), erasable PROM (EPROM), and electrically erasable PROM (EEPROM)), and other optional special purpose logic devices (e.g., application specific integrated circuits (ASICs)) or configurable logic devices (e.g., generic array of logic (GAL) or reprogrammable field programmable gate arrays (FPGAs)). The computer system 1000 also includes plural input devices, such as a keyboard 1022 and a mouse 1024, and a display card 1010 for controlling a monitor 1020. In addition, the computer system 1000 further includes a floppy disk drive 1014; other removable media devices (e.g., a compact disc 1019, a tape, and a removable magneto-optical media); and a hard disk 1012, or other fixed, high density media drives, connected using an appropriate device bus (e.g., a small computer system interface (SCSI) bus, and enhanced integrated device electronics (IDE) bus, or an ultra-direct memory access (DMA) bus). The computer system 1000 may additionally include a compact disc reader 1018, a compact disc reader-writer unit, or a compact disc juke box, each of which may be connected to the same device bus or another device bus. Although the compact disc 1019 is shown in a CD caddy, the compact disc 1019 can be inserted directly into CD-ROM drives which do not require caddies. In addition, a printer may provide printed listings of the information shown in FIGS. 4 and 5 or any other data stored and/or generated by the computer system 1000.

As stated above, the system includes at least one computer readable medium or memory programmed according to the teachings of the invention and for containing data structures, tables, records, or other data described herein. Examples of computer readable media are compact discs, hard disks, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 1000 and for enabling the computer 1000 to interact with a human user (e.g., a consumer). Such software may include, but is not limited to, device drivers, operating systems and user applications, such as development tools. Such computer readable media further includes the computer program product of the present invention for performing all or a portion (if processing is distributed) of the processing performed in implementing the invention. The computer code devices of the present invention can be any interpreted or executable code mechanism, including but not limited to scripts, interpreters, dynamic link libraries, Java classes, and complete executable programs. Moreover, parts of the processing of the present invention may be distributed for better performance, reliability, and/or cost. Preferably the computer system 1000 runs a browser application for displaying HTML documents provided by the Web fax server 102.

The invention may also be implemented by the preparation of application specific integrated circuits or by interconnecting an appropriate network of conventional component circuits, as will be readily apparent to those skilled in the art.

Obviously, numerous modifications and variations of the present invention are possible in light of the above teachings. It is therefore to be understood that within the scope of the appended claims, the invention may be practiced otherwise than as specifically described herein.

The invention claimed is:

1. A network fax machine for faxing files received from a remote client, comprising:
   a server unit configured to send a fax document form to a remote client over a network using an HTTP communication protocol and configured to receive fax information entered using a Web browser on said fax document form from the remote client using the HTTP communication protocol, the fax information including (1) an identifier identifying a destination fax machine, and (2) a file stored on the remote client to be faxed to the destination fax machine; and
   a fax control unit configured to use the identifier to connect the network fax machine to the destination fax machine and configured to send the file to the destination fax machine by facsimile communication, wherein the destination fax machine is located remotely from the remote client.

2. A network fax machine according to claim 1, wherein the server unit comprises:
   a hypertext transfer protocol server configured to serve a hypertext markup language document to the remote client, the hypertext markup language document including the fax document form.

3. A network fax machine according to claim 1, further comprising:
   a network adapter, the network adapter including the server unit.

4. A network fax machine according to claim 3, wherein the network adapter comprises:
   a network interface card.

5. A network fax machine according to claim 1, wherein the fax control unit is configured to connect to a public switched telephone network and is configured to send the file to the destination fax machine via the public switched telephone network.

6. A network fax machine according to claim 1, further comprising:
   a common gateway interface configured to read and parse the fax information received by the server unit.

7. A network fax machine according to claim 6, further comprising:
   a fax job manager configured to convert the file to be faxed into a facsimile format.

8. A method for faxing files received from a remote client, comprising:
   sending a fax document form to a remote client over a network using an HTTP communication protocol;
   receiving, by a network fax machine, fax information entered using a Web browser on said fax document form from the remote client using the HTTP communication protocol, the fax information including (1) an identifier identifying a destination fax machine, and (2) a file stored on the remote client to be faxed to the destination fax machine;
   connecting the network fax machine to the destination fax machine using the identifier; and
   sending the file to the destination fax machine by facsimile communication, wherein the destination fax machine is located remotely from the remote client.

9. A method according to claim 8, wherein the step of sending comprises:
   serving a hypertext markup language document to the remote client, the hypertext markup language document including the fax document form.

10. A method according to claim 8, wherein the step of connecting comprises:
    connecting to a public switched telephone network; and wherein the step of sending comprises:
    sending the file to the destination fax machine via the public switched telephone network.

11. A method according to claim 8, further comprising the step of:
    reading and parsing the fax information received from the remote client.

12. A method according to claim 11, further comprising the step of:
    converting the file to be faxed into a facsimile format.

13. A network fax machine for faxing files received from a remote client, comprising:
    means for sending a fax document form to a remote client over a network using an HTTP communication protocol;
    means for receiving fax information entered using a Web browser on said fax document form from the remote client using the HTTP communication protocol, the fax information including (1) an identifier identifying a destination fax machine, and (2) a file stored on the remote client to be faxed to the destination fax machine;
    means for connecting the network fax machine to the destination fax machine using the identifier; and
    means for sending the file to the destination fax machine by facsimile communication, wherein the destination fax machine is located remotely from the remote client.

14. A network fax machine according to claim 13, wherein the means for sending a fax document form to a remote client and for receiving fax information from the remote client comprises:
    means for serving a hypertext markup language document to the remote client, the hypertext markup language document including the fax document form.

15. A network fax machine according to claim 13, wherein the means for connecting the network fax machine to the destination fax machine comprises:
    means for connecting the network fax machine to a public switched telephone network; and
    wherein the means for sending the file to the destination fax machine by facsimile communication comprises:

means for sending the file to the destination fax machine via the public switched telephone network.

16. A network fax machine according to claim 13, further comprising:
   means for reading and parsing the fax information received by the means for receiving.

17. A network fax machine according to claim 16, further comprising:
   means for converting the file to be faxed into a facsimile format.

18. A computer readable medium containing program instructions for execution on a computer system, which when executed by a network fax machine, cause the network fax machine to perform method steps for faxing files received from a remote client, said method comprising the steps of:
   sending a fax document form to a remote client over a network using an HTTP communication protocol;
   receiving fax information entered using a Web browser on said fax document form from the remote client using the HTTP communication protocol, the fax information including (1) an identifier identifying a destination fax machine, and (2) a file stored on the remote client to be faxed to the destination fax machine;
   connecting the network fax machine to the destination fax machine using the identifier; and
   sending the file to the destination fax machine by facsimile communication, wherein the destination fax machine is located remotely from the remote client and the remote client.

19. A computer readable medium according to claim 18, wherein the step of sending comprises:
   serving a hypertext markup language document to the remote client, the hypertext markup language document including the fax document form.

20. A computer readable medium according to claim 18, wherein the step of connecting comprises:
   connecting to a public switched telephone network; and
   wherein the step of sending comprises:
   sending the file to the destination fax machine via the public switched telephone network.

21. A computer readable medium according to claim 18, further comprising program instructions for causing the computer to perform the step of:
   reading and parsing the fax information received from the remote client.

22. A computer readable medium according to claim 21, further comprising program instructions for causing the computer to perform the step of
   converting the file to be faxed into a facsimile format.

* * * * *